(12) United States Patent
Koike et al.

(10) Patent No.: US 6,324,942 B1
(45) Date of Patent: Dec. 4, 2001

(54) ENGINE CRANKSHAFT MADE BY FORGING

(75) Inventors: Takayuki Koike; Toshihiro Matsui, both of Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/478,242

(22) Filed: Jan. 4, 2000

(30) Foreign Application Priority Data

Jan. 13, 1999 (JP) .................................................. 11-006766

(51) Int. Cl.⁷ .............................. F16F 15/28; F16C 3/20
(52) U.S. Cl. ............................................ 74/603; 123/192.2
(58) Field of Search .......................... 74/603, 604, 595; 123/192.1, 192.2

(56) References Cited

U.S. PATENT DOCUMENTS

| | | | |
|---|---|---|---|
| 1,660,171 | * 2/1928 | Larcher | 74/603 |
| 1,661,341 | * 3/1928 | Oldson | 74/603 |
| 1,705,165 | * 3/1929 | Twyman et al. | 74/603 |
| 1,705,187 | * 3/1929 | Keeports | 74/603 |
| 1,756,659 | * 4/1930 | Oldson | 74/603 |
| 2,815,682 | 12/1957 | Kolbe et al. | 74/603 |
| 4,730,512 | * 3/1988 | Ito et al. | 74/603 X |
| 4,867,007 | * 9/1989 | Krotky | 74/603 X |
| 5,305,656 | * 4/1994 | Kamiya et al. | 74/603 X |

FOREIGN PATENT DOCUMENTS

| | | |
|---|---|---|
| 6-79406 | 3/1994 | (JP) . |
| 08105431 | 4/1996 | (JP) . |
| 10029032 | 2/1998 | (JP) . |

\* cited by examiner

Primary Examiner—Mary Ann Green
(74) Attorney, Agent, or Firm—McCormick, Paulding & Huber LLP

(57) ABSTRACT

An engine crankshaft (1) made by forging, that has larger counter weights (8) without increasing a manufacturing cost. Engaging two dies with each other performs the forging. Each counter weight (8) has a plurality of inclinations ($\theta_1$, $\theta_2$) to facilitate removal of the dies from the crankshaft after the forging process is complete. The inclinations are reduced as they are apart from a die mating surface (P). The maximum thickness (T) of each counter weight (8) is not enlarged so that interference between the counter weights and neighboring parts is avoided. No machining is required after the forging process.

6 Claims, 2 Drawing Sheets

1-1 CROSS SECTION 3-3 CROSS SECTION 1-1 CROSS SECTION 1-1 CROSS SECTION 3-3 CROSS SECTION

ENGINE CRANKSHAFT MADE BY FORGING

BACKGROUND OF THE INVENTION

1. Field of the Invention

The present invention generally relates to a forged crankshaft for an internal combustion engine, and more particularly to such a crankshaft having larger counter weights but not causing interference between the counter weights and neighboring parts of the engine.

2. Description of the Related Art

Making of crankshafts for internal combustion engines by forging is known in the art. In general, a crankshaft has a plurality of counter weights to improve dynamic balance of the crankshaft. The improved dynamic balance will reduce vibrations of the engine.

In order to improve the balancing of the crankshaft, larger counter weights may be attached to the crankshaft so that a weight of the crankshaft with the counter weights increases. However, other parts such as pistons, connecting rods and cylinder block exist near the counter weights, so that use of larger counter weights is generally difficult. In order to place the larger counter weights in a limited space, the counter weights may be machined to complicated shapes so that the counter weights extend in gaps between the neighboring parts and do not contact the neighboring parts. This approach, however, raises a manufacturing cost of the crankshaft because of the machining process.

SUMMARY OF THE INVENTION

An object of the present invention is to provide a crankshaft for an internal combustion engine, on which larger counter weights can be mounted without increasing the manufacturing process step and cost.

Another object of the present invention is to provide an engine crankshaft having larger counter weights that do not interfere with neighboring parts.

Still another object of the present invention is to provide a forged crankshaft having larger counter weights that can be fabricated by simply changing forging dies while employing a conventional manufacturing method in other aspects.

Yet another object of the present invention is to provide a method of manufacturing an engine crankshaft by forging, which can realize both easy removal of forging dies from a product (crankshaft) and formation of large counter weights.

According to one aspect of the present invention, there is provided an engine crankshaft having at least one counter weight and made by forging, the forging being performed by pressing two dies with each other, characterized in that the counter weight has a plurality of inclinations to facilitate removal of the dies from the crankshaft after the forging process is completed, and degree of inclination of the plurality of inclinations is reduced as the plurality of inclinations are apart from a die mating surface.

Conventionally, each counter weight has a single inclination to facilitate removal of the forging dies from the crankshaft. In the invention, there are provided a plurality of inclinations to effectively enlarge the size of each counter weight. The inclinations are determined such that the maximum thickness of each counter weight is not enlarged, but the total volume of the counter weights is enlarged. Since the maximum thickness is the same as a conventional crankshaft, interference between the crankshaft and neighboring parts is avoided. No machining is required after the fording process, in order to have counter weights having a desired enlarged shape.

DETAILED DESCRIPTION OF THE INVENTION

Now, an embodiment of the present invention will be described in reference to the accompanying drawings.

Figure 4:
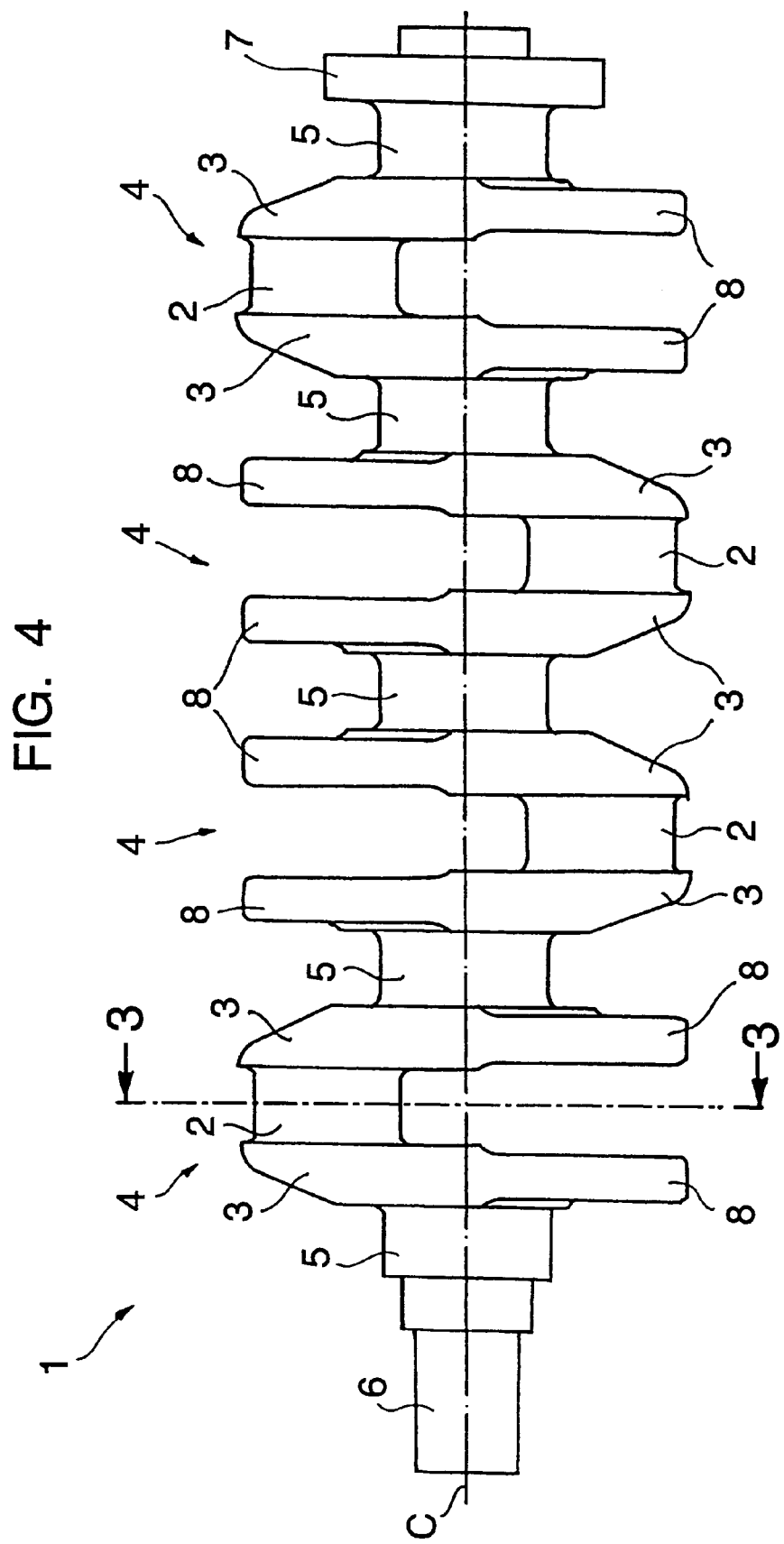
FIG. 4 illustrates a front view of the crankshaft according to the present invention.

Referring first to FIG. 4, illustrated is a crankshaft 1 according to the present invention that is made by forging. This crankshaft 1 may be used with a four-cylinder engine. The crankshaft 1 has five crank journals 5 coaxially. A centerline C of the crankshaft 1 is defined by these five crank journals 5. The crank journals 5 are rotatably supported by bearing portions of a cylinder block (not shown). Between each two adjacent crank journals 5, formed is a crank portion 4. This crankshaft 1 has, therefore, four crank portions 4 for four cylinders. Each crank portion 4 has a crank pin 2 that engages with a large end of an associated connecting rod (not shown), and a pair of crank arms 3 bridging the crank pin 2 and associated crank journals 5. Two of the four crank portions 4 at the ends of the crankshaft 1 have a 180-degree phase difference relative to other two crank portions 4 at the center. An auxiliary drive shaft 6 extends coaxially from the left end crank journal 5, and an output flange shaft 7 extends coaxially from the right end crank journal 5.

Each crank arm 3 has a counter weight 8 in such a manner that the counter weight 8 is positioned opposite the associated crank pin 2 with respect to the crankshaft centerline C.

Figure 3:
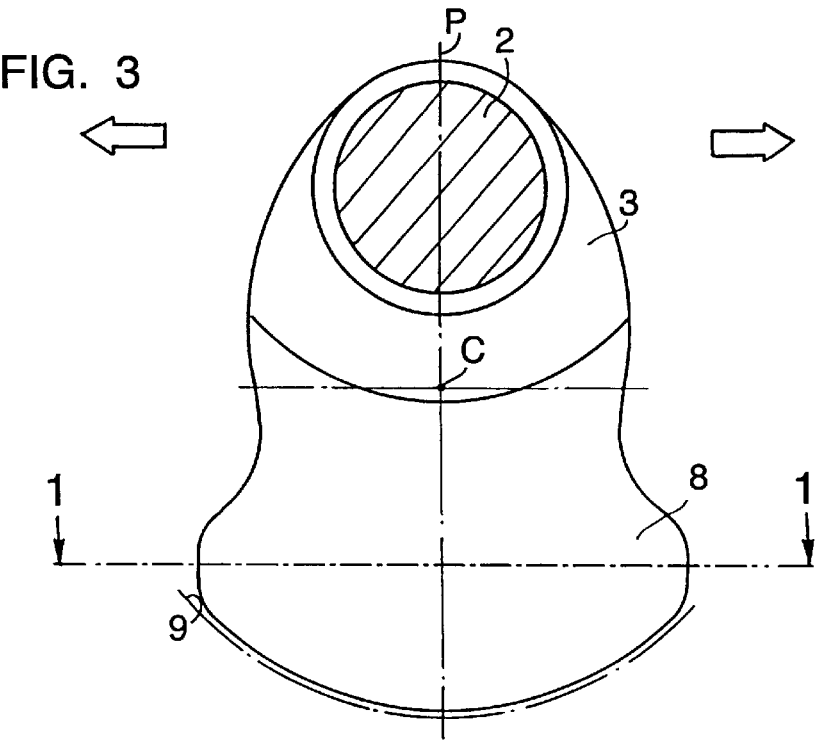
FIG. 3 illustrates a transversal cross sectional view of the crankshaft according to the present invention, taken along the line 3—3 in FIG. 4.

As best understood from FIG. 3, each counter weight 8 has a larger width than the crank arm 3 when viewed in the axial direction of the crankshaft. The counter weight 8 has an arc periphery about the center C. The phantom line 9 in the drawing indicates a neighboring part. Only a slight clearance is left between the counter weight 8 and the neighboring part 9.

When the crankshaft 1 is forged, utilized are a pair of metallic molds (not shown) that are divisible in a direction perpendicular to the sheet of FIG. 4. Each metallic mold forms a half of the crankshaft 1. The line P in FIG. 3, which extends vertically through the crankshaft center C and the center of the crank pin 2, indicates the mating face of the two metallic molds. Two opposite unshaded arrows in FIG. 3 indicate the directions in which the metallic molds are separated.

Figure 2:
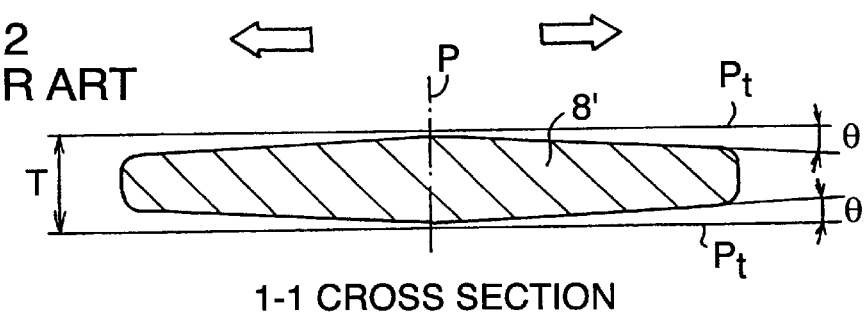
FIG. 2 is similar to FIG. 1, illustrating a cross sectional view of a counter weight according a prior art, which should be compared with FIG. 1.

Referring now to FIG. 2, a conventional manner of fabricating a crankshaft is briefly discussed. This conventional crankshaft is disclosed in Japanese Patent Application, Laid-Open Publication No. 8-105431. Each counter weight 8' has inclination θ to facilitate removal of an associated die (not shown) from the counter weight 8'. In other words, each of the counter weights 8' is reduced in thickness as it is apart from the die mating surface P, so that each counter weight 8' has a predetermined constant taper on both sides. In the illustrated example, the angle θ is 2 degrees. This angle is measured from a line Pt perpendicular to the die mating surface P. A certain angle is needed for removal of the forging dies. Otherwise (when θ=0), the forging dies could not taken away from the counter weights. T indicates a counter weight maximum thickness which is acceptable in view of neighboring parts (not shown) when the crankshaft is assembled in an engine.

Figure 1:
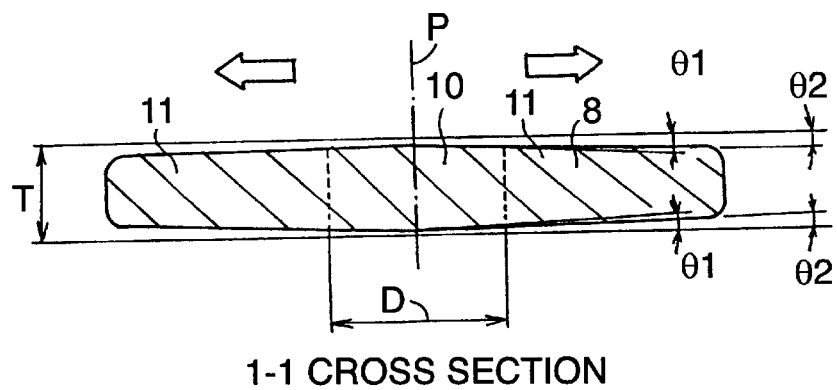
FIG. 1 illustrates a cross sectional view of a counter weight according to the present invention, taken along the line 1—1 in FIG. 3.

Referring now to FIG. 1, illustrated is a similar cross sectional view of the crankshaft 1 according to the present invention. The taper of the counter weight 8 is relatively large in an area close to the die mating surface P and relatively small in a further area. Specifically, the counter weight 8 has a first inclination θ1 in the center area 10 (indicated by the double arrow D) and a second smaller inclination 74 2 ($\theta 2 < \theta 1$) in a distal area 11. In the drawing, θ1=2 degrees and θ2 =1 degree. Thus, the counter weight 8 has two different tapers. Other aspects of the crankshaft 1 of the invention are the same as the conventional crankshaft shown in FIG. 2. The same or similar reference symbols are used in FIGS. 1 and 2 to designate same or similar elements. Of course, the maximum thickness T is the same in FIGS. 1 and 2.

The thickness of the counter weight 8 shown in FIG. 1 in the distal area 11 is greater than the conventional counter weight 8' shown in FIG. 2. Therefore, it is possible to employ larger (and heavier) counter weights as compared with the conventional crankshaft. It should be noted that this weight increase is realized without enlarging the maximum thickness T of the counter weight. Therefore, interference with the neighboring parts would not arise.

As understood from the foregoing, simply changing the taper of the counter weight or utilizing new metallic molds enlarges the size of the counter weights 8. No machining is required after the forging in order to avoid interference between the enlarged counter weights and neighboring parts of the engine. Therefore, a manufacturing cost is not raised. The same manufacturing process as employed in the conventional art is applicable to the novel crankshaft of the invention as long as new forging dies are prepared.

It should be noted here that a raw material is squeezed toward the die mating surface as the forging dies are engaged with each other. Therefore, the pressure in the material in the dies is larger in an area close to the die mating surface than in a further area. In view of this, the first inclination θ1 in the center area 10 is made greater than the second inclination θ2. In other words, a smaller value can be used for the second inclination. Taking advantage of this, the present invention can provide large-scaled counter weights 8 without causing drawbacks. With this idea, no manufacturing disadvantages arise, but performance of the engine equipped with the crankshaft 1 of the invention is simply improved.

The present invention is not limited to the illustrated and described crankshaft 1. For example, the first and second inclinations may have values other than 2° and 1°. The counter weight 8 may have three or more different inclinations. In this case, the inclinations are reduced in turn as they are apart from the die mating surface P. The present invention is also applicable to an engine having cylinders more or less than four.

The illustrated and described crankshaft for an internal combustion engine is disclosed in Japanese Patent Application No. 11-6766 filed on Jan. 13, 1999, the instant application claims priority of this Japanese Patent Application, and the entire disclosure thereof is incorporated herein by reference.

What is claimed is:

1. An engine crankshaft having at least one counter weight and made by forging, the forging having been performed by pressing two dies toward one another until the dies mate with each other along a die mating surface fixed relative to the crankshaft, wherein the counter weight on each side of the die mating surface has a plurality of inclinations to facilitate removal of the dies from the crankshaft after the forging process is completed, each inclination being such that the thickness of the counter weight is reduced with increases in distance from the die mating surface, and the degree of inclination of the plurality of inclinations is reduced as the inclinations become farther spaced from the die mating surface.

2. The engine crankshaft according to claim 1, wherein the crankshaft includes a plurality of crank journals coaxial about a crankshaft center axis, and at least one crank portion having a crank pin parallel to and spaced from said center axis, a pair of crank arms, and a pair of said counter weights extending from the pair of crank arms in a direction away from the crank pin to points located on an opposite side of said center axis from the crank pin.

3. The engine crankshaft according to clam 2, wherein the engine crankshaft has four of said crank portions.

4. The engine crankshaft according to claim 2, wherein each counter weight has a greater width than the crank arm when viewed in an axial direction of the crankshaft.

5. The engine crankshaft according to claim 1, wherein the plurality of inclinations are first and second inclinations.

6. The engine crankshaft according to claim 5, wherein the first inclination is 2 degrees and the second inclination is 1 degree.

* * * * *